3,811,972
PROCESS FOR MAKING A LITHIUM DOPED
BERYLLIUM HYDRIDE COMPOSITE
Leonard M. Niebylski, Birmingham, Mich., and Gottfried
J. Brendel, Baton Rouge, La., assignors to Ethyl Corporation, Richmond, Va.
No Drawing. Filed June 2, 1969, Ser. No. 830,222
Int. Cl. C06b 15/00
U.S. Cl. 149—109
22 Claims

ABSTRACT OF THE DISCLOSURE

Lithium-doped amorphous beryllium hydride slurried with relatively small amounts of an inert liquid slurry medium can be crystallized by exposure for a sufficient time to elevated temperature and pressure. Suitable solvents are high-boiling hydrocarbons. A vitreous composite suitable for use in this crystallization process can be prepared by compressing lithium-doped, amorphous beryllium hydride and heating the resulting compact.

---

The invention herein described was made in the course of or under a contract or subcontract thereunder with the United States Air Force.

This invention relates to novel processes for (1) the conversion of finely divided, amorphous beryllium hydride to a vitreous form, (2) the preparation of crystalline beryllium hydride from the vitreous form, and (3) the preparation of crystalline beryllium hydride directly from the finely divided, amorphous form.

Beryllium hydride has been synthesized by Coates & Glockling [J. Chem. Soc. 2526 (1954)] by the pyrolysis or ditertiary-butylberyllium etherate and by Head, Holley and Rabideau [J. Am. Chem. Soc. 79, 3687 (1957)] using ether-free di-tertiary-butylberyllium. More recently a superior product was obtained by the pyrolysis of di-tertiary-butylberyllium etherate dissolved in a high-boiling inert solvent (co-pending application Ser. No. 176,865, filed Feb. 26, 1962).

Because of its low heat of formation, high reducing power and low molecular weight, beryllium hydride is of great interest as a potential fuel component of solid rocket propellants. For this utility a relatively high density is of great importance. The beryllium hydride products of the above synthetic processes are without exception amorphous in structure and as a result are characterized by a relatively low density, 0.57 to 0.67 gram per cc., which limits their suitability for this application.

Still more recently it was found that when amorphous beryllium hydride containing a relatively minor amount of certain lithium compounds is subjected to compaction at elevated temperature and pressure, the hydride is converted to a crystalline material of significantly higher density than the amorphous beryllium hydride similarly compacted in the absence of additives. A number of lithium compounds were found effective for inducing crystallization via compaction (co-pending application Ser. No. 392,677, filed Aug. 24, 1964).

The foregoing crystallization process utilized as its starting material beryllium hydride prepared by the above-mentioned solution pyrolysis procedure. Since the crystallization process utilized dry amorphous starting material, the complete removal of solvents from the solution pyrolysis product was a necessary step.

It is an object of the present invention to provide a process for the preparation of crystalline beryllium hydride of high density which will avoid the trouble and expense of the solvent separation step.

A further object is to provide a process for the preparation of high-density crystalline beryllium hydride which is readily amenable to scale-up to large-volume operation.

Another object is to provide a process for the preparation of a novel vitreous form of beryllium hydride which is itself a useful raw material for the preparation of crystalline beryllium hydride. Other objects will appear hereinafter.

In its broadest aspect, therefore, this invention relates to the crystallization of amorphous beryllium hydride in the pressure of an inert liquid slurry medium, referred to hereinafter as the slurry process, and to the preparation of a vitreous, amorphous compact of beryllium hydride suitable for use in the crystallization process.

A preferred embodiment of this invention is the process of preparing a vitreous, amorphous beryllium hydride-containing composite of increased bulk density by subjecting a dry, finely divided amorphous beryllium hydride-containing composite to a compacting pressure of from about 20,000 to about 200,000 pounds per square inch while at a temperature of from ambient temperature to about 170° C., reducing the pressure to ambient pressure, and heating the resulting compressed composite to a temperature between about 150 and about 200° C. for a period of from about 1 to about 30 minutes. The finely divided amorphous composite used as the starting material contains from about 99.9 to about 90.0 mole percent of beryllium hydride and from about 0.1 to about 10.0 mole percent of lithium hydride, lithium aluminum tetrahydride, an alkyllithium wherein the alkyl radical contains from 2 to about 10 carbon atoms, or a combination of any two or more of the foregoing lithium compounds. This process is referred to hereinafter as the compaction-fusion process.

A particularly preferred embodiment is that variation of the above process wherein the compacting pressure is applied at ambient temperature, because this variation permits the separation of the compaction and heating processes and the consequent use of simpler and more economical equipment.

Another preferred embodiment of this invention is the process for the preparation of a crystalline beryllium hydride-containing composite of increased density which comprises heating, at a temperature of from about 170 to about 230° C., under a pressure of from about 70,000 to about 140,000 pounds per square inch and for a period of from about 30 minutes to about 4 hours, a slurry comprised of from about 30 to about 80 percent of an inert liquid slurry medium and from about 70 to about 20 percent of an amorphous beryllium hydride-containing composite, both based on the weight of the slurry, the amorphous composite containing from about 99.9 to about 90.0 mole percent of beryllium hydride and from about 0.1 to about 10.0 mole percent of lithium hydride, lithium aluminum tetrahydride or an alkyllithium wherein the alkyl radical contains from 2 to about 10 carbon atoms, to produce the crystalline composite, and recovery the crystalline composite.

A particularly preferred embodiment of this invention is the use in the above process of a crystallization temperature in the range of from about 190 to about 220° C., a pressure of from about 90,000 to about 120,000 pounds per square inch, a crystallization period of from about 30 minutes to about 2 hours, and an amorphous beryllium hydride-containing composite which contains from about 0.5 to about 3.0 mole percent of lithium compound.

Another preferred embodiment is the above crystallization process wherein the starting material is the vitreous amorphous composite obtained as the product of the above compaction process and wherein the inert slurry medium is present in the amount of from about 5 to about 5 to about 80 percent, based on the combined weights of the vitreous composite and the solvent.

Another particularly preferred embodiment is the above crystallization process wherein the starting material is the vitreous amorphous composite obtained as the product of the above compaction process and wherein the inert slurry medium is present in the amount of from about 5 to about 20 percent, based on the combined weights of the vitreous composite and the solvent.

Still another preferred embodiment of this invention is the two-stage process for the preparation of a crystalline beryllium hydride-containing composite which comprises, in the first stage, subjecting a finely divided, amorphous beryllium hydride-containing composite which contains from about 99.9 to about 90.0 mole percent of beryllium hydride and from about 0.1 to about 10.0 mole percent of lithium hydride, lithium aluminum tetrahydride or an alkyllithium wherein the alkyl radical contains from 2 to about 10 carbon atoms, to a compacting pressure of from about 20,000 to about 200,000 pounds per square inch while at a temperature of from ambient temperature to about 170° C., reducing the pressure to ambient pressure and heating the resulting compressed composite to a temperature between about 150 and about 200° C. for a period of from about 1 to 30 minutes to produce a vitreous, amorphous beryllium hydride-containing composite and, in the second stage, heating the vitreous composite with from about 5 to about 50 percent of an inert liquid slurry medium, based on the combined weights of the vitreous composite and the solvent, at a temperature of from about 170 to about 230° C., under a pressure of from about 70,000 to about 140,000 pounds per square inch, and for a period of from about 30 minutes to about 4 hours to produce the desired crystalline composite and recovering the latter by known methods.

Another particularly preferred embodiment is that variation of the above two-stage process wherein the compacting pressure is applied at ambient temperature.

A further particularly preferred embodiment of this invention is that variation of the above two-stage process wherein the inert liquid slurry medium is employed in an amount of from about 5 to about 20 percent, based on the combined weights of the vitreous composite and the solvent.

Other embodiments will appear hereinafter.

The crystallization process of this invention exhibits a number of distinct advantages over the processes of the prior art. One of these is that the amorphous beryllium hydride product of the solution pyrolysis process can be used directly, without drying, solvent removal or other treatment, as raw material of the present process. This avoids the inconvenience and expense involved in the intermediate separation stage of the older process. Furthermore, since no isolation of feed material is required, degradation due to the exposure characteristics of the earlier process is reduced appreciably. This results not only in better efficiency of the lithium crystallization catalyst but also in higher purity of the final product. Furthermore, the slurry technique of the present invention is well suited for large-volume scale-up operations because of the ease of charging to and discharging from the high-pressure vessel.

The product of the compaction-fusion process of this invention is a very hard, completely amorphous compact which varies in color from a very pale grey to a medium grey and in luster from a dull, non-lustrous appearance to a high degree of vitreous luster. The density, as determined by the sink-float method, is generally in the range of 0.63 to 0.65 g./cc.

The crystalline beryllium hydride product obtained by the process of this invention is a white to greyish crystalline composite. Two different crystal modifications have been identified by their typical X-ray diffraction patterns.

One form, which is characterized by its strongest diffraction lines (in the order of decreasing relative intensity) corresponding to lattice spacings of 3.38 angstrom units ($I/I_0$=100), 2.079(60), 1.347(10), 1.780(5), 3.22(3), 2.94(3), 2.84(3), 2.69(3), and 1.960(3), has been indexed as being hexagonal with the following lattice parameters: $a=b=4.14$–4.20 A. and $c=6.76$ A. with a calculated theoretical density of close to 0.82 g./cc. Its measured density, by the sink-float method, is 0.73–0.74 g./cc. This species is designated hereinafter as Phase 338.

The second crystalline form is characterized by its strongest diffraction lines (in the order of decreasing relative intensity) at $d=3.78$ angstrom units (100), 2.95(80), 2.07(40), 2.86(20), 1.966(10), 1.938(4), 1.720(4), 1.669(3), 1.349(3), 1.263(3), 1.192(3), 1.1396(3), 1.0917(3), and 1.835(2). Its density, by the sink-float method, is 0.77–0.78 g./cc. This species is designated hereinafter as Phase 378.

The sink-float method consists simply of adding a lump of material to a hydrocarbon solvent and varying the temperature until the particle begins to sink or to float. The temperature at which this occurs is recorded and the density of the solvent (equal to the density of the solids) is determined from a preconstructed curve for which the density-temperature relationship has been determined. Benzene, $n$-nonane, 1,3,5-trimethylbenzene and methylcyclohexane were the solvents used.

The high-pressure hydrostatic equipment used for compaction by the slurry technique consisted of a control panel with pressure generating units connected to a pressure vessel rated at 200,000 p.s.i. The high-pressure fluid was a mixture of white gasoline and high-boiling lubricating oil.

The samples for compaction were contained in ¾ inch O.D. by 3 to 4 inch seamless, extruded aluminum capsules of wall thickness 0.015–0.020 inch. The capsules were sealed with close-fitting stainless steel plugs, fitted with two Viton O-rings. A threaded hole through the center of each plug permitted escape of gas while the capsule was closed. This hole finally was sealed securely with a cap-screw and Viton washer. In order to prevent extrusion of amorphous beryllium hydride composite into the threads a small steel disc was used to cover the hole.

The procedure for charging the feed material simply involved spooning the heavy slurry, or introducing the compacted beryllium hydride composite and the high-boiling solvent, into the capsule, squeezing out excess oil and sealing with a steel plug as described above. During compaction the pressure of the hydrostatic fluid collapsed the thin-wall capsule around the contained slurry, the pressure thus being applied to the slurry itself.

The invention will be more fully understood by reference to the following set of illustrative examples.

TABLE I.—HYDROSTATIC COMPACTION OF HYDROCARBON—WET, LITHIUM-DOPED BERYLLIUM HYDRIDE

| Expt. No. | Feed material [a] | Solids, wt. percent | Test conditions | | | Product color [c] | Product density, g./cc.[b] | X-ray diffraction data estimated concentration (percent) | | |
|---|---|---|---|---|---|---|---|---|---|---|
| | | | Pressure, K p.s.i. | Temp., °C. | Time, hrs. | | | Amorphous | Phase 338 | Phase 378 |
| 1 | (e) | | 70 | 205 | 1.0 | 1 | 0.75 | 0 | ~100 | Trace |
| 2 | (d) | ~32 | 117-140 | 25 | 0.5 | 0 | 0.65 | 100 | 0 | 0 |
| 3 | (f) | 70 | 95 | 220 | 1.5 | 2 | 0.74 | 0 | 95-99 | 1-5 |
| 4 | (d) | 31 | 140 | 230 | 1.0 | 5 | 0.75 | 0 | 45 | 55 |
| 5 | (d) | 14 | 96 | 210 | 2.0 | 2 | 0.68 | 100 | 0 | 0 |
| 6 | (e) | 17 | 96 | 160 | 2.0 | 0 | 0.68 | | | |
| 7 | (d) | 26 | 96 | 220 | 1.5 | 7 | 0.76 | | | |
| 8 | (e) | 65 | 95 | 213 | 0.9 | | 0.74 | | | |
| 9 | (g) | 66 | 98 | 220 | 0.8 | | 0.76-0.77 | 0 | 10-15 | 85-90 |
| 10 | (d) | 25 | 120 | 215-20 | 0.6 | | 0.74 | 0 | 95 | 5 |

[a] 95 weight percent dry BeH₂, 1.3 weight percent Li.
[b] As determined by liquid displacement.
[c] Arbitrary color scale ranging from white (0) over light grey (2), medium grey (4-5) to dark grey (7). Applied to finely divided dry product.
[d] Composite feed as in (a), but still wet from its production in high-boiling mineral oil.
[e] Dry composite feed as in (a), but soaked with dry Decalin (Expt. 6) or dry hydraulic fluid consisting of a mixture of white gasoline and mineral oil (Expts. 1 and 8).
[f] Dry composite feed as in (a) which was first precompacted in a piston mold unit at 80,000 p.s.i. and 25° C., then ground and finally soaked with high-boiling mineral oil.
[g] re compacted, thermally fused feed material which was ground and slurried in high-boiling mineral oil.

An examination of the above table shows (1) that, unless the beryllium hydride slurry contains at least about 20 weight percent of solids, neither crystallization nor significant increase of density occurs under the present process conditions (see Experiments 5 and 6), and (2) that high pressure alone (at least within the range studied) is insufficient to cause crystallization or density increase in the absence of an elevated temperature (Experiment 2).

The amorphous beryllium hydride used in the process of this invention can be prepared by any method that yields a product of relatively high purity. The solution pyrolysis procedure hitherto described yields a highly satisfactory starting material.

The lithium compound used to initiate the crystallization can be mixed mechanically with the amorphous beryllium hydride but is preferably dissolved in or mixed with the beryllium alkyl prior to pyrolysis. The lithium initiator is suitably lithium hydride, lithium aluminum hydride or an alkyl lithium compound containing from 2 to about 10 carbon atoms, for example, ethyl-lithium, n-propyllithium, tertiary-butyllithium, n-hexyl-lithium, 2-ethylhexyllithium, isononyllithium, or n-decyllithium.

A wide range of concentrations of the lithium initiator compound can be employed. Thus, its concentration in the amorphous beryllium hydride can range from less than 0.1 to more than 10.0 mole percent. The preferred range of concentrations is from about 0.5 to about 3.0 mole percent because the sensitivity of the product to air and moisture varies directly with the lithium content and at the higher lithium concentrations, this sensitivity poses a problem of handling the material without excessive decomposition.

The above discussion of reaction conditions is valid for all three processes of this invention. For the sake of clarity, the remaining conditions will be discussed separately under the individual processes to which they apply.

PREPARATION OF VITREOUS BERYLLIUM HYDRIDE BY COMPACTION-FUSION PROCESS

The experimental results obtained with the compaction-fusion process are summarized in Table II.

TABLE II.—COMPACTION-FUSION PRETREATMENT OF LITHIUM-DOPED BERYLLIUM HYDRIDE [a]

| Expt. No. | Test conditions | | | Product density (g./cc.)[d] | X-ray diffraction data estimated conc. (percent) | |
|---|---|---|---|---|---|---|
| | Pressure (K p.s.i.)[b] | Temperature (°C.)[c] | Time (min.)[c] | | Amorphous | Crystalline |
| 11 | 150 | 155 | 35 | 0.65 | 100 | 0 |
| 12 | 200 | 155 | 35 | 0.65-0.70 | 100 | 0 |
| 13 | 200 | 175 | 35 | 0.64 | 100 | 0 |
| 14 | 200 | 185 | 1 | 0.63-0.65 | 100 | 0 |
| 15 | 200 | 200 | 5 | 0.63-0.64 | 100 | 0 |
| 16 | 200 | 200 | 35 | 0.64 | 100 | 0 |

[a] Beryllium hydride feed: 95.7 wt. percent BeH₂, 1.3 wt. percent Li.
[b] Pellet compaction at ambient temperature.
[c] At atmospheric pressure; heating time at indicated temperature.
[d] As measured by sink-float method.

The temperature employed in the compaction-fusion process can range from ambient temperature to about 170° C. in the compaction stage and from about 150° to about 200° C. in the fusion stage, and the pressure can range from about 20,000 to about 200,000 pounds per square inch in the compaction stage.

The preferred temperatures in the compaction stage are determined in part by the compaction pressure selected. When compaction pressures in the range of 150,000 to 200,000 pounds per square inch are employed, compacts are obtained at from ambient temperature to about 50° C. which are satisfactory for use in the fusion stage, and this temperature range is therefore preferred. However at lower pressures of, say, 20,000 to 50,000 pounds per square inch, compaction temperatures of at least about 150° C. are needed to produce a compact which will yield a vitreous fusion product suitable for use in the crystallization process described herein. Temperatures in the range of from about 150° to about 170° C. are preferred, inasmuch as the upper temperature limit is far enough removed from the decomposition temperature of the hydride to avoid significant contamination of the product from this source.

The preferred temperature in the fusion stage is in the range of from about 185° to about 195° C., since in this range fusion of beryllium hydride proceeds rapidly enough and thermal decomposition slowly enough that the former occurs almost to the exclusion of the latter.

The duration of the fusion stage can range from about 1 minute to about 1 hour. Periods of from about 1 to about 30 minutes are preferred because, with longer heating times, incipient thermal decomposition may occur in the preferred temperature range.

Inspection of Table II shows that (1) no crystallization occurs under the conditions of the compaction-fusion pretreatment, and (2) the density of the resulting compact is substantially independent of the specific test conditions.

The slurry medium employed in the crystallization process of the present invention may be any substance which, under the operating conditions, is in the liquid phase and is inert with respect to both reactants and products, Hydrocarbons are the substances of choice because they are generally inert under the operating conditions, but the slurry medium is not limited thereto. Suitable hydrocarbons include: n-hexane, 2,2-dimethylhexane, i-octane, n-dodecane, n-cetane, gasoline, kerosene, benzene, toluene, the xylenes, ethyl benzene, mesitylene, hemimellitene, pseudocumene, cumene, prehnitene, isodurene, 1-heptene, 1-decene, cyclohexane, methylcyclohexane, 1,3-dimethylcyclohexane, 1,4-dimethylcyclohexane, methylcyclopentane, ethylcyclopentane, 1,1-dimethylcyclopentane, cyclohexene, tetrahydronaphthalene, decahydronaphthalene, 1-methylnaphthalene, 1-ethylnaphthalene, 2-ethylnaphthalene and 1,4-dimethylnaphthalene.

CRYSTALLIZATION OF VITREOUS BERYLLIUM HYDRIDE

The temperature employed in the crystallization of vitreous beryllium hydride can range from about 170° to about 230° C. Temperatures in the range of from about 190° to about 220° C. are preferred because such temperatures are high enough to yield a reasonable crystallization rate and low enough to avoid serious thermal decomposition of the hydride.

The pressure employed in the crystallization of vitreous beryllium hydride can range from about 70,000 to about 140,000 p.s.i., but pressures in the range of from about 90,000 to about 120,000 p.s.i. are preferred because lower pressures lead to a reduced crystallization rate, whereas higher pressures are less economical because of the expense involved in the construction of the equipment required for work with such higher pressures.

The time required for the completion of the crystallization stage is a complex function of the other variables; a period in the range of from about 3 minutes to about 4 hours is generally satisfactory, but a period of from about 30 minutes to about 1 hour is preferred because this shorter period is adequate to yield essentially complete crystallization when preferred values of the other variables are employed.

The amount of inert solvent used in the crystallization of vitreous beryllium hydride can range from about 5 to about 80 percent, based on the combined weights of the vitreous composite and the solvent, but amounts of from about 5 to about 20 percent are preferred because the corresponding high solids concentrations ("loadings") are more economical, since they permit the processing of an increased amount of vitreous composite per batch.

CRYSTALLIZATION OF WET, FINELY DIVIDED AMORPHOUS BERYLLIUM HYDRIDE

The operating conditions with respect to temperature, pressure and reaction time are substantially identical with those described above for the crystallization of vitreous amorphous beryllium hydride, except that the preferred reaction time is from about 30 minutes to about 2 hours. However, the limits of solids concentration in the slurry are markedly different for the two processes. Thus, when the slurry of finely divided, amorphous beryllium hydride is crystallized directly, without preliminary compaction to the vitreous form, the solids concentration can range from about 20 to about 70 percent by weight, i.e., the amount of inert, high-boiling solvent can range from about 30 to about 80 percent by weight; at solids loadings much below 20 percent, the process yields largely or completely amorphous product of a density approaching that of the starting material whereas, at loadings greatly exceeding 70 percent, there is insufficient liquid to protect the beryllium hydride against access of atmospheric moisture. Furthermore, high solid loading yields a more compact product, characterized by increased difficulty of comminution and washing. Of the concentrations within the above range, those above 40 percent are preferred, because lower concentrations are less economical owing to low throughput.

The process of the invention may be carried out under any atmosphere inert to both beryllium hydride and the lithium initiator compound. The use of dry nitrogen is preferred because of its availability and economy. Other suitable protective atmospheres include gaseous saturated hydrocarbons such as methane and ethane and the noble gases helium, neon, argon krypton, and xenon.

The relatively high density of the crystalline composite produced by the processes of this invention permits formulation of liquid and solid propellants containing a high weight percent loading of beryllium hydride. This results in propellants having a significantly higher delivered impulse than those previously reported.

Furthermore, the crystalline character of the product leads to increased compatibility with other fuel components and to increased ease of handling and mixing.

Moreover, the ease of decomposition with dilute acid of the dense beryllium hydride prepared by the process of this invention makes it a useful and convenient source for the production of small amounts of pure hydrogen in the field.

We claim:

1. The process for the preparation of a crystalline beryllium hydride-containing composite of increased density which comprises heating, at a temperature of from about 170 to about 230° C., under a pressure of from about 70,000 to about 140,000 pounds per square inch and for a period of from about 30 minutes to about 4 hours, a slurry comprised of from about 30 to about 80 percent of an inert liquid medium and from about 70 to about 20 percent of an amorphous beryllium hydride-containing composite, both based on the weight of said slurry, said amorphous composite containing from about 99.9 to 90.0 mole percent of beryllium hydride and from about 0.1 to about 10.0 mole percent of lithium hydride, lithium aluminum tetrahydride or an alkyllithium wherein the alkyl radical contains from 2 to about 10 carbon atoms, to produce said crystalline composite, and recovering said crystalline composite.

2. The process of claim 1 wherein said temperature is from about 190 to about 220° C.

3. The process of claim 1 wherein said pressure is from about 90,000 to about 120,000 pounds per square inch.

4. The process of claim 1 wherein said period is from about 30 minutes to about 2 hours.

5. The process of claim 1 wherein said amorphous beryllium hydride-containing composite contains from about 0.5 to about 3.0 mole percent of said lithium compound.

6. The process of claim 1 wherein said temperature is from about 190 to about 220° C. and said pressure is from about 90,000 to about 120,000 pounds per square inch.

7. The process of claim 1, wherein said temperature is from about 190 to about 220° C., said pressure is from about 90,000 to about 120,000 pounds per square inch, said period is from about 30 minutes to about 2 hours, and said amorphous beryllium hydride-containing composite contains from about 0.5 to about 3.0 mole percent of said lithium compound.

8. The process for the preparation of a vitreous amorphous beryllium hydride-containing composite of increased bulk density which comprises subjecting a dry, finely divided amorphous beryllium hydride-containing composite to a compacting pressure of from about 20,000 to about 200,000 pounds per square inch while at a compaction temperature of from ambient temperature to about 170°

C., reducing said compacting pressure to ambient pressure, heating the resulting compressed composite to a fusion temperature between about 150 and about 200° C., and maintaining said fusion temperature for a period of from about 1 to about 30 minutes to produce said vitreous composite, said finely divided amorphous composite containing from about 99.9 to about 90.0 mole percent of beryllium hydride and from about 0.1 to about 10.0 mole percent of lithium hydride, lithium aluminum tetrahydride or an alkyllithium wherein the alkyl radical contains from 2 to about 10 carbon atoms.

9. The process of claim 8 wherein said compacting pressure is applied at ambient temperature.

10. The process of claim 8 wherein said compacting pressure is from 20,000 to about 50,000 p.s.i., and said compaction temperature is from about 150° to about 170° C.

11. The process of claim 8 wherein said compacting pressure is from about 150,000 to about 200,000 p.s.i. and said compaction temperature is from ambient temperature to about 50° C.

12. The process of claim 8 wherein said fusion temperature is from about 185° to about 195° C.

13. The process of claim 8 wherein said fusion temperature is maintained for a period of from about 1 to about 30 minutes.

14. The process of claim 8 wherein said amorphous beryllium hydride-containing composite contains from about 0.5 to about 3.0 mole percent of said lithium compound.

15. The process of claim 8 wherein said compacting pressure is applied at ambient temperature.

16. The process of claim 8 wherein said inert, high-boiling solvent is employed in an amount of from about 5 to about 20 percent, based on the combined weights of said vitreous composite and said solvent.

17. The two-stage process for the preparation of a crystalline beryllium hydride-containing composite which comprises, in the first stage, subjecting a finely divided amorphous beryllium hydride-containing composite, which contains from about 99.9 to about 90.0 mole percent of beryllium hydride and from about 0.1 to about 10.0 mole percent of lithium hydride, lithium aluminum tetrahydride or an alkyllithium wherein the alkyl radical contains from 2 to about 10 carbon atoms, to a compacting pressure of from about 20,000 to about 200,000 pounds per square inch while at a temperature of from ambient temperature to about 170° C., reducing said pressure to ambient pressure, heating the resulting compressed composite to a temperature between about 150 and about 200° C. and maintaining said temperature for a period of from about 1 to about 30 minutes to produce a vitreous amorphous beryllium hydride-containing composite and, in the second stage, heating said vitreous composite with from about 5 to about 50 percent of an inert liquid medium, based on the combined weights of said vitreous composite and said solvent, at a temperature of from about 170 to about 230° C., under a pressure of from about 70,000 to about 140,000 pounds per square inch and for a period of from about 30 minutes to about 4 hours, to produce said crystalline composite, and recovering said crystalline composite.

18. The process for the preparation of a crystalline beryllium hydride-containing composite which comprises heating a vitreous, amorphous beryllium hydride-containing composite, said vitreous amorphous composite containing from about 99.9 to about 90.0 mole percent of beryllium hydride and from about 0.1 to about 10.0 mole percent of lithium hydride, lithium aluminum tetrahydride or an alkyllithium wherein the alkyl radical contains from 2 to about 10 carbon atoms, with from about 5 to about 80 percent of an inert, high-boiling solvent, based on the combined weights of said vitreous composite and said solvent, at a temperature of from about 170 to about 230° C., under a pressure of from about 70,000 to about 140,000 pounds per square inch and for a period of from about 30 minutes to about 4 hours, to produce said crystalline composite, and recovering said crystalline composite.

19. The process of claim 18 wherein said inert high-boiling solvent is employed in an amount of from about 5 to about 20 percent, based on the combined weights of said vitreous composite and said solvent.

20. The process of claim 18 wherein said temperature is from about 190 to about 220° C.

21. The process of claim 18 wherein said pressure is from about 90,000 to about 120,000 pounds per square inch.

22. The process of claim 18 wherein said period is from about 30 minutes to about 2 hours.

References Cited

UNITED STATES PATENTS

| | | |
|---|---|---|
| 3,324,206 | 6/1967 | Lieberman et al. _____ 264—3 |
| 3,441,455 | 4/1969 | Woods et al. _____ 149—87 X |

STEPHEN J. LECHERT, JR., Primary Examiner

U.S. Cl. X.R.

149—87; 423—646, 647

PO-1050
(5/69)

UNITED STATES PATENT OFFICE
CERTIFICATE OF CORRECTION

Patent No. 3,811,972      Dated May 21, 1974

Inventor(s) Leonard M. Niebylski and Gottfried J. Brendel

It is certified that error appears in the above-identified patent and that said Letters Patent are hereby corrected as shown below:

Column 2, line 19, "pressure" should read -- presence --. Column 3, line 20, "about 5 to about 80" should read -- about 80 --. Column 4, line 51, "units" should read -- unit --. Column 5, Table I, the designation g is omitted from last footnote; Table I, footnote g, "recompacted" should read -- Precompacted --. Column 7, line 10, "products," should read -- products. --; line 44, "3 minutes" should read -- 30 minutes --. Column 8, line 41, "99.9 to" should read -- 99.9 to about --.

Signed and sealed this 1st day of October 1974.

(SEAL)
Attest:

McCOY M. GIBSON JR.      C. MARSHALL DANN
Attesting Officer      Commissioner of Patents